United States Patent [19]

Masujima et al.

[11] Patent Number: 4,484,251
[45] Date of Patent: Nov. 20, 1984

[54] CURRENT RESTRICTION ELEMENT RESPONSIVE TO APPLIED VOLTAGE

[75] Inventors: Sho Masujima; Yoshishige Towatari; Shoichi Iwaya; Hitoshi Masumura; Hisao Abe; Norimasa Sakamoto, all of Tokyo, Japan

[73] Assignee: TDK Electronics Co., Ltd., Tokyo, Japan

[21] Appl. No.: 425,076
[22] PCT Filed: Feb. 20, 1982
[86] PCT No.: PCT/JP82/00047
§ 371 Date: Sep. 20, 1982
§ 102(e) Date: Sep. 20, 1982
[87] PCT Pub. No.: WO83/03028
PCT Pub. Date: Sep. 1, 1983
[51] Int. Cl.³ .................. H01G 4/10; H01L 29/12
[52] U.S. Cl. .................... 361/321; 252/520
[58] Field of Search ............ 361/320, 321; 501/136, 501/137, 139; 252/520

[56] References Cited

U.S. PATENT DOCUMENTS 2,899,611  8/1959  Bradley et al. ............. 361/321 X
4,226,735 10/1980  Sakabe ........................ 361/321 X
4,241,378 12/1980  Dorrian ....................... 361/321 X
4,403,236  9/1983  Mandai et al. ................ 252/520 X

FOREIGN PATENT DOCUMENTS 45265  4/1976  Japan ............................. 361/320

OTHER PUBLICATIONS

Japanese Laid-open Publication No. 56621/80 cited with mark Y in the International Search Report.

Primary Examiner—Donald A. Griffin
Attorney, Agent, or Firm—Armstrong, Nikaido, Marmelstein & Kubovcik

[57] ABSTRACT

A current restriction device for alternate circuit with small size, low producing cost and low power loss has been found by using a ferro-electric body with rectangular hysterisis characteristics. Said device is used for instance as a ballast for restricting current in a fluorescent lamp. Said ferro-electric body has main component of $B_aT_iO_3$, additive of $S_r$ or $P_b$ for substitution of part of $B_a$ and $Z_n$ or $S_n$ for substitution of part of $T_i$, and a mineralizer of $M_nO$ or $C_{r2}O_3$. The voltage-current characteristics of said ferro-electric body show non-linearity that the impedance ratio ($Z_2/Z_1$) of the impedance $Z_2$ measured with alternate field of 500 volts/mm to the impedance $Z_1$ measured with alternate field of 5 volts/mm is less than 1/10.

5 Claims, 11 Drawing Figures

CURRENT RESTRICTION ELEMENT RESPONSIVE TO APPLIED VOLTAGE

FIELD OF THE INVENTION

The present invention relates to a current restriction element responsive to applied voltage, in particular, relates to a polycrystalline ferro-electric ceramics having a rectangular hysterisis characteristics, in which an impedance of said ceramics depends upon voltage applied to the same.

BACKGROUND OF THE INVENTION

The present element has the main component $B_aT_iO_3$ and/or other additives $S_r$, $Z_r$, $S_n$, and/or $P_b$ which replace partially said component.

The present invention provides a low loss impedance element for an alternate current, by using the change of an apparent dielectric constant of ceramics of $B_aT_iO_3$ series.

Generally, a power source for industry and home consumer is 50 or 60 Hz, 100 volts or 200 volts of single phase or three phase power source. And, a passive element for adjusting current for a low impedance load coupled with said power source is, for instance, an inductance (L), a capacitance (C), and a resistance (R).

Among them, a resistance element is the cheapest, but it has the disadvantage that the heat generation is large, and further, the generated heat is not only the undesired power loss, but also the generated heat decreases the reliability of the whole system by raising the temperature of the same. Therefore, a resistance element is not used at present except for restricting very small current.

An inductance element (L) is mostly utilized at present, for instance as a choke coil (a ballast in a fluorescent lamp circuit is one of them).

An inductance element has the advantages that loss is small even in a large current situation, heat generation is small, and therefore, the reliability of the system itself does not decrease by the use of an inductance element. Further, when the current is large, a small inductance element is enough, and therefore, the number of turns of a coil may be small. However, when the current is large, a thick conductor must be used for a coil, and therefore, the size and/or the weight of the element is large, thus, it might be difficult to install an inductance element for current restriction in a miniaturized small apparatus.

When a capacitance element (C) is used, the capacity must be large in case of low frequency like 50 or 60 Hz. In particular, when large current flows, the reactance must be small and therefore, large capacitance must be utilized. Further, an electrolytic capacitor with aluminium film which is a typical large capacity capacitor at present is not sufficiently reliable at high temperature. Accordingly, an impedance element with a small size, high capacity, high withstand voltage, high thermal stability, and low cost has been desired.

A prior art for satisfying the above requirements is a ceramic capacitor having the dielectric material $B_aT_iO_3$.

The reason for that is the dielectric constant of $B_aT_iO_3$ is higher than 20,000 while the dielectric constant (specific inductive capacity) of other materials like mica, paper, or plastics film is in the range between 3 and 15. Therefore, a capacitor with $B_aT_iO_3$ is small in size as compared with the capacity of the same.

Further, since ceramics are sintered with the temperature 1300°–1400° C., the thermal stability is excellent, and the operational reliability is also excellent.

However, a capacitor with $B_aT_iO_3$ has the disadvantage that the capacity for a unit volume is not so large, since the $B_aT_iO_3$ series dielectric body is ceramics and therefore, it can not be folded.

A capacity C of a capacitor with a pair of parallel electrodes is given by the equation below.

$$C = \frac{\epsilon_0 \times \epsilon_s \times S}{t}$$

where C is capacity (Farad), $\epsilon_0$ is the dielectric constant of the vacuum, $\epsilon_s$ is the specific inductive capacity of the dielectric body (ratio of the dielectric constant to $\epsilon_0$), S is the area (m$^2$) of the electrodes, t is the thickness (m) of the dielectric body. Accordingly, in order to obtain large capacity, the thickness (t) must be thin, the specific inductive capacity ($\epsilon_s$) must be large, and the area (S) must be large.

FIGS. 1A and 1B show a prior capacitor with $B_aT_iO_3$. In the figures, the reference numeral 1 is a dielectric body, 2 and 3 are electrodes, 4 and 5 are lead wires, and 6 is an insulation plastics. The capacity with the structure of FIGS. 1A and 1B is up to 0.05 μF due to the restriction by the mechanical strength and the size.

When a laminated structure as shown in FIGS. 2A and 2B is used, the substantial area of the electrodes becomes large depending upon the superposed number of electrodes, and a large capacity is obtained. In FIGS. 2A and 2B, the reference numeral 1 is a dielectric body, 2 is an inner electrode, and 2a is an external electrode.

However, the laminated structure has the disadvantage that the withstand voltage is low since the dielectric body is very thin, and the price is rather high since a rare metal like $P_t$, $A_u$, $P_d$, $A_g$ must be used for electrodes.

SUMMARY OF THE INVENTION

Accordingly, the object of the present invention is to overcome the disadvantages of a prior art, by providing a current restriction element (impedance element) which is small in size, low in cost, and low in power loss. The basic concept of the present invention is to use the rectangular hysterisis characteristics of ferro-electric material, and the main component of the present element is a ferro-electric polycrystalline ceramics of $B_aT_iO_3$ which has the rectangular hysterisis characteristics in which the impedance measured by using the electric field 500 volts/mm is less than one-tenth (1/10) of the impedance measured by using the electrical field 5 volts/mm.

Preferably, $B_a$ of $B_aT_iO_3$ is partially replaced by $S_r$, or $P_b$, and $T_i$ is partially replaced by $Z_r$ or $S_n$ for improving the impedance characteristics.

Preferably, a mineralizer or additive agent composed of at least one of 0.005–0.3 weight % of chromium ($C_r$) and 0.005–0.3 weight % of manganese ($M_n$) is added for improving the impedance characteristics.

Still preferably, some impurities included are less than 0.5 weight %.

PREFERRED EMBODIMENTS OF THE INVENTION

When a current restriction element is implemented by a ferro-electric body for an alternate circuit, a reactance component determined by capacitance, and a resistance component which is equivalently coupled in series with the reactance component must be considered. The resistance component generates the undesired power loss, and therefore, that resistance component should be as small as possible. However, that resistance component is rigidly coupled with the reactance component, and it is impossible to adjust resistance component or reactance component separately. Accordingly, it is not enough to provide high capacity for obtaining low reactance by using material with high specific inductive capacity. Therefore, the basic idea of the present invention resides to use the adaptive specific inductive capacity ($\epsilon_s$) depending to the applied alternate voltage in $B_aT_iO_3$ series ceramics.

The Japanese patent publication No. 44440/77 shows that the specific inductive capacity $\epsilon_s$ of $B_aT_iO_3$ series ceramics increases by 100-140% when an alternate voltage is applied to the same. The fact that the specific inductive capacity depends upon the applied voltage suggests that the dielectric polarization which affects the specific inductive capacity depends upon the applied voltage ($\epsilon_s$). In a conventional dielectric body, the specific inductive capacity ($\epsilon_s$) depends very little on the applied voltage.

It has been well known that the dielectric flux density D in a dielectric body is given by the following equation.

$$D = \epsilon E = \epsilon_0 \epsilon_s E$$

where

D is dielectric flux density (C/m²), $\epsilon$ is dielectric constant, $\epsilon_0$ is the dielectric constant in vacuum, $\epsilon_s$ is the specific inductive capacity of the dielectric body or the ratio of the dielectric constant of the dielectric body to the dielectric constant in vacuum, and E is the electric field (V/m).

The above relation is measured by measuring the D-E hysterisis curve by using a Sawyer-Tower circuit.

Figure 1A:
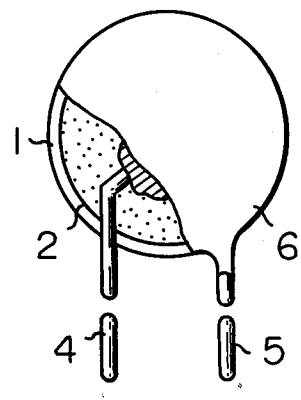
FIGS. 1A and 1B show the structure of a prior ferro-electric ceramics capacitor.
Figure 1B:
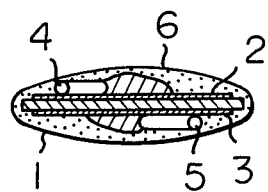
Figure 2A:
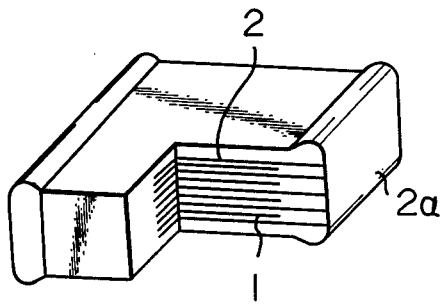
FIGS. 2A and 2B show another structure of a prior ferro-electric ceramics capacitor.
Figure 2B:
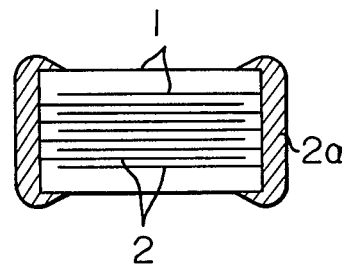
Figure 3:
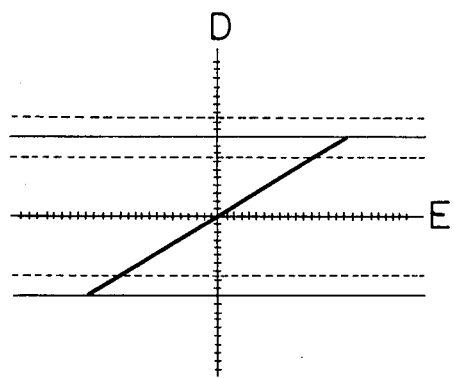
FIG. 3 shows the D-E curve (Dielectric flux density-Electric field curve) of a conventional ferro-electric body.

FIG. 3 shows the D-E hysterisis curve of a conventional dielectric body. As shown in FIG. 3, the D-E curve of a conventional dielectric body is almost linear.

Figure 4:
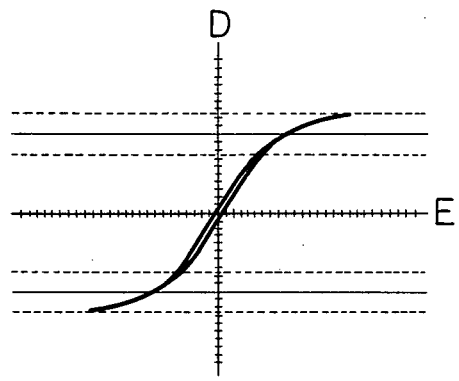
FIG. 4 shows the D-E curve of a prior $B_aT_iO_3$.

FIG. 4 shows the D-E curve of a conventional $B_aT_iO_3$ series ceramics with high specific inductive capacity, and it should be noted that the D-E curve is not linear, but the value ($\epsilon$) depends upon the applied electric field E (in the embodiment, the value $\epsilon_s$ is 18,000). We made a capacitor with the sample of FIG. 4, and measured the relationship between the capacity of that capacitor and the applied field, and we confirmed that the capacity depends upon the applied voltage as shown in FIG. 4. However, we also found that an impedance itself of that capacitor depends little upon the applied voltage.

It should be appreciated that the fact that the D-E curve is not linear comes from the fact that the dielectric constant ($\epsilon$) depends upon the applied alternate voltage, and the fact that the D-E curve increases rapidly comes from the fact that the dielectric constant ($\epsilon$) increases rapidly with the increase of the applied voltage. Further, it should be noted that the area enclosed by the hysterisis curve relates to the equivalent resistance or the power loss.

Conventionally, an $ABO_3$ type ferro-electric dielectric body, in which $B_aT_iO_3$ is the typical one of them, is used for its high dielectric constant, and peizo-electric nature. However, the use of the D-E hysterisis nature has not been enough because satisfactory material which provides a rectangular hysterisis curve has not been known.

The present inventors developed dielectric ceramics which provides the excellent rectangular hysterisis characteristics with steep rising characteristics, and also developed a current restriction element or a variable impedance element for an alternate circuit by using the nature that the capacitance and the impedance of said ceramics depends considerably upon the applied alternate field.

The present inventors found that an excellent current restriction element is obtained by $B_aT_iO_3$ itself, and/or an element which substitutes partially $T_i$ of $B_aT_iO_3$ with $S_n$ or $Z_r$, and/or an element which substitutes partially $B_a$ with $S_r$ or $P_b$. Ceramics except $B_aT_iO_3$ is not found to be practical since its capacity increase coefficient is small, and/or an impedance does not decrease until very high voltage which is higher than withstand voltage is applied. Further we found that some additives including oxide of $M_n$ and/or $Cr$ to said $B_aT_iO_3$ improve the polychrystalline by preventing the re-oxidation in the sintering process. The characteristics depend upon the additives and their amount, and in our experiment, $M_n$ and $C_r$ are the best, and the desired amount of those additives is 0.005-0.3 weight % in case of $M_n$, and 0.005-0.3 weight % in case of $C_r$. It is possible to add the mixture of the two ($M_n$ and $C_r$) additives. An additive $S_r$, $S_n$, $Z_r$, or $P_b$ enters in a crystal of $B_aT_iO_3$, and compose a solid solution, thus, the characteristics of the crystal is improved without deteriorating the ferro-electricity of the crystal. An additive $M_n$ or $C_r$ functions as a mineralizer which improves the sintering process and prevents the re-oxidation.

Each of those additives is paraelectric dielectric body itself, and has different electric nature from that of a crystal particle. Since the purpose of the present element is to provide the dependency of the dielectric constant on the voltage, the amount of the para-electric additive is preferable that it is as few as possible, and that fact has been confirmed by the experiment with various amount of mineralizers. Some impurities like $Al_2O_3$ or $S_iO_2$ which is included in raw material of the present element, or added in producing process, produces a para-electrical dielectric body by being deposited from the crystal particles, or compose a solid solution with $B_aT_iO_3$, and therefore, the ferro-electricity itself of the element is reduced. Therefore, an allowable amount of those impurities is very small. Accordingly, the amount and/or the kind of the mineralizers, or impurities of the present element are very restricted as compared with other ferro-electrical dielectric bodyies. Therefore, in a producing process of the present element, the raw material and the producing process must be checked very carefully as compared with those of a prior dielectric body producing process.

As a result, the present current restriction element has the excellent voltage dependency in which the impedance at 500 volts is less than 1/100 of the impedance at 5 volts, and thus, a completely novel alternate current restriction element has been found. The present current restriction element is small in size, light in weight, and has high operational reliability with low producing cost. Therefore, it has wide application field in the electrical industry.

(Embodiment 1)

The raw material power $B_aCO_3$, $T_iO_2$, $S_nO_2$, $Z_rO_2$, $S_rO_2$, $P_bO$, and/or $M_nCO_3$ are mixtured in wet condition using a polyethylene pot and an agate ball so that the desired mixtures of the samples 1 through 15 of the table 1 are obtained. After dehydrating and drying, it held at 1150° C. for 2 hours to pre-sintering, and then crushed again into powders with a polyethylene pot and an agate ball. Evaporating the moisture, adding a proper quantity of binder to them, and then fabricated into a disc with the diameter of 16.5 mm, and the thickness of 0.50 mm with a 10-tons press. And then, it was sintered at 1300°–1400° C. for 2 hours.

Figure 6:
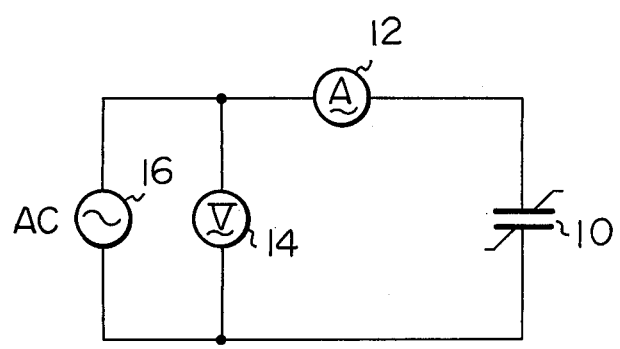
FIG. 6 is a circuit diagram for measuring the characteristics of a current restriction element.

A silver electrode was baked on the ceramic device thus obtained, and lead wires are soldered to the electrode. After cleaning, painted with insulating paint, and measured effective current flowed in the circuit by applying 50 Hz alternate voltage in the circuit of FIG. 6. Then, we calculated impedance. In FIG. 6, the reference numeral 10 is a sample, 12 is an alternate ammeter, 14 is an alternate voltmeter, and 16 is an alternate power source of 50 Hz.

Figure 5:
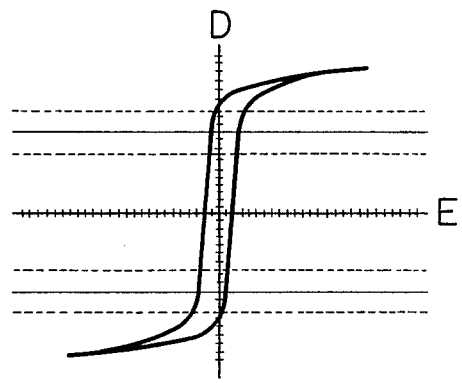
FIG. 5 shows the D-E curve of the present current restriction element.
Figure 7:
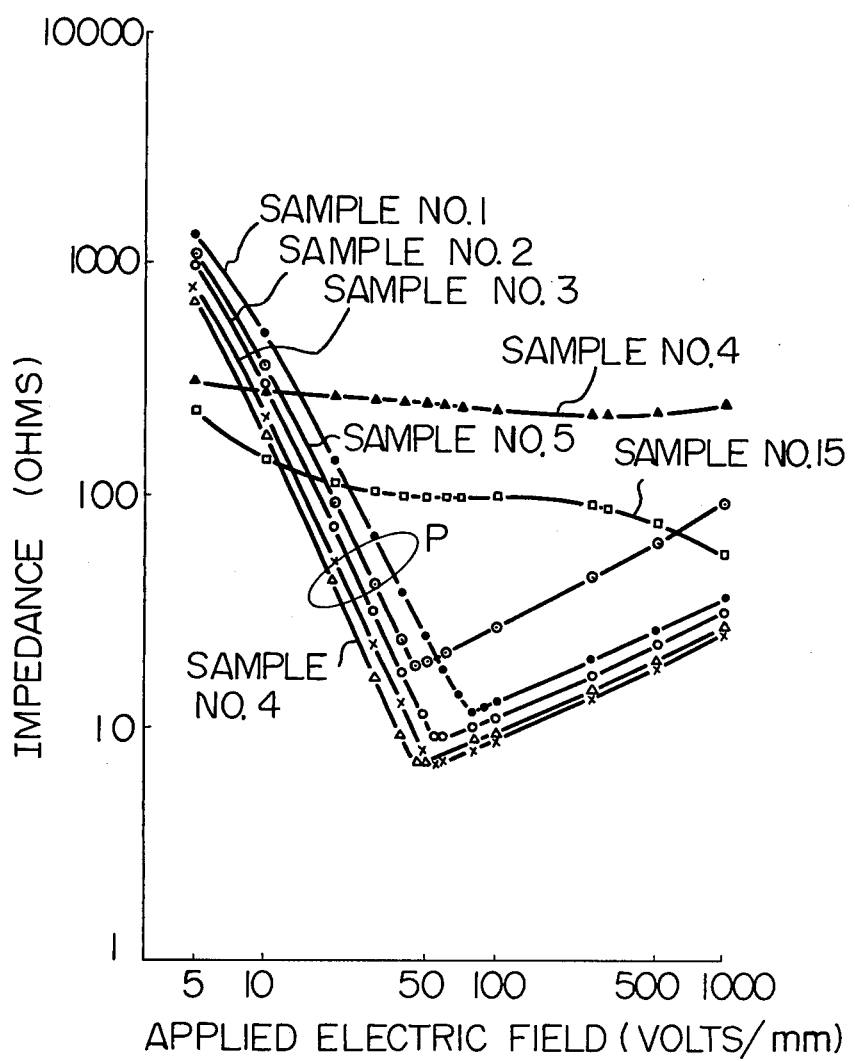
FIGS. 7, 8 and 9 show the experimental results between the applied electric field and the measured impedance of the current restriction element according to the present invention.

The experimental results are shown in the table 1, FIG. 7 and FIG. 5. In the table 1 and FIG. 7, the samples No. 14 and No. 15 are not involved in the scope of the present invention, but those samples are shown merely for the comparison purpose with the present invention.

The samples No. 1 through No. 13 in the table 1 and FIG. 7 show that the ratio ($Z_2/Z_1$) of the impedance $Z_2$ for the field of 500 volts/mm to the impedance $Z_1$ for the field of 5 volts/mm (rms) is in the range between 1/20 and 1/108, and therefore, each of those samples satisfies the request for a practical current restriction element, which requires that ratio less than 1/10.

FIG. 7 shows the relation between the impedance and the applied field volts/mm (rms), and it should be noted that the samples belonging to the group P which is included with the present invention have the characteristics hat the impedance decreases first with the increase of the field, but that impedance increases again when the field is higher than 50–100 volts/mm. The theoretical reason why the impedance increases for the field higher than 50–100 volts/mm is not clear at present. Anyway, it should be appreciated that the sufficiently low impedance is obtained when the field is less than 500 volts/mm. The impedance shown in FIG. 7 was measured by using said disc with the diameter of 16.5 mm, and the thickness of 0.50 mm, with electrodes.

FIG. 5 shows the experimental D-E hysterisis curve of the sample No. 3 of the table 1, and it should be noted that it has an excellent hysterisis characteristic. In the experiment of FIG. 5, the thickness of the sample is 0.50 mm, and the applied alternate field is 280 volts (rms), therefore, the field of 560 volts/mm is applied to the sample.

As apparent from the above description, an element with the main component of $B_aT_iO_3$ decreases the impedance considerably in the high electrical field condition, and it has been found that $B_aT_iO_3$ has the particular nature as compared with other ferro-electric dielectric bodies.

TABLE 1

| Sample No. | Composition (Mineralizer $MnCO_3$ = 0.01 wt %) | | Electric Characteristics (50 Hz) | | |
|---|---|---|---|---|---|
| | | | Impedance $Z_1$ with 5 volts/mm | Minimum Impedance $Z_2$ with 500 volts/mm | Ratio $\left(\dfrac{Z_2}{Z_1}\right)$ |
| 1 | $BaTiO_3 + BaSnO_3$ | 2 mol % | 1300 | 12 | 1/108 |
| 2 | " | 6 mol % | 970 | 9.2 | 1/105 |
| 3 | " | 10 mol % | 960 | 7.2 | 1/106 |
| 4 | " | 12 mol % | 680 | 7.0 | 1/97 |
| 5 | " | 16 mol % | 1050 | 19 | 1/55 |
| 6 | $BaTiO_3 + SrTiO_3$ | 4 mol % | 900 | 26 | 1/35 |
| 7 | " | 6 mol % | 800 | 18 | 1/44 |
| 8 | " | 8 mol % | 1100 | 21 | 1/52 |
| 9 | $BaTiO_3 + BaZrO_3$ | 4 mol % | 700 | 22 | 1/32 |
| 10 | " | 8 mol % | 500 | 21 | 1/24 |
| 11 | " | 12 mol % | 700 | 30 | 1/23 |
| 12 | $BaTiO_3 + PbTiO_3$ | 1 mol % | 1400 | 28 | 1/50 |
| 13 | " | 3 mol % | 1400 | 70 | 1/20 |
| X14 | $PbTiO_3 - Pb(Mg_{\frac{1}{3}}Nb_{\frac{2}{3}})O_3 - Pb(Mn_{\frac{1}{3}}Nb_{\frac{2}{3}})O_3$ 5 mol % + 95 mol % + 0.5 wt % | | 310 | 220 | 1/1.4 |
| X15 | $(Pb0.962 - Sr0.04)[(Nb_{\frac{2}{3}} - Co_{\frac{1}{3}})0.01 - Ti0.458 - Zr0.532]O_3 + WO_30.6$ | | 230 | 78 | 1/2.9 |

(Embodiment 2)

The samples No. 1 through No. 13 which have the main component $B_aT_iO_3$ and showed the excellent result in the embodiment 1 are examined in more detail by adding some additives. Among them, the most average data are shown in the table 2 and FIG. 8. In the table 2, the main component is the mixture of $B_aT_iO_3$ of 94 mol-% and $B_aS_nO_3$ of 6 mol-%, and an additive is $M_nCO_3$ or $C_{r2}O_3$, or the mixture of them with the amount as shown in the table 2. The experiment is accomplished similar to that of the embodiment 1. In the table 2, we found that the more fine, homogeneous and excellent polycrystalline substance which prevents the re-oxidation and improves the sintering property without deteriorating the electrical nature of an element, has been obtained. In the experiment, the additives $M_n$ or $C_r$ are added in the form of $M_nCO_3$ or $C_{r2}O_3$, but the present invention is not restricted to them, but other compounds including $M_n$ or $C_r$ may give the same result. The amount of the additive depends upon the compound which includes $M_n$ or $C_r$, and in the form of $C_{r2}O_3$, the weight percent in the range between 0.005% and 0.5% is preferable, and when that weight percent is higher than 0.5%, the decrease of the impedance becomes small, and is not preferable.

Figure 8:
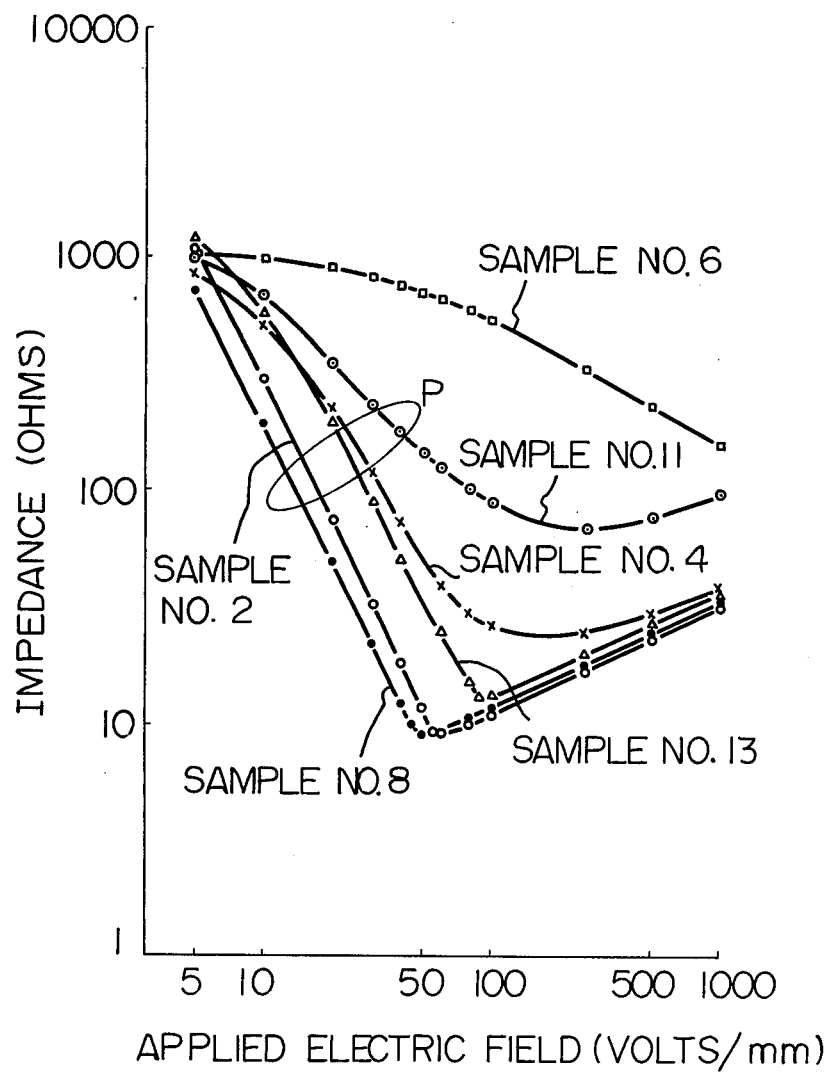

FIG. 8 shows the curves between the field and the impedance for each amount of additives, and it should be noted in FIG. 8, that the range between 0.05% and 0.3% which belongs to the group P, is preferable for the electrical property, in particular, for the decrease of the impedance. When the amount is less than 0.005 weight %, no effect by adding an additive is measured. In case of $M_nCO_3$, the practical range is between 0.005 weight % and 0.3 weight %, and when that weight % is less than 0.005 weight %, no effect is measured.

Further, the addition of $M_nCO_3$ or $C_{r2}O_3$ prevents the reduction or re-oxidation in the sintering process, and improves the fineness of particles in the sintering process.

In the table 2 and FIG. 8, the samples 6 and 12 are not included in the scope of the present invention.

be less than 0.5 weight % (group P), otherwise, the decrease of the impedance is not enough. It should be appreciated that the amount (0.5%) is considerably small as compared with an allowable impurity in a prior ceramics, or the samples except the sample No. 1 or the sample No. 2 which include the impurities of 0.6–1.0 weight %. The reason that little allowable impurities are allowed to be present resides in that an additive and/or impurity which does not compose of a solid solution with $B_aT_iO_3$ is deposited out of a crystal, and composes a para-electric dielectric layer; and then, the property of ferro-electricity of the ceramics is weakened. Therefore, the amount of impurities in the present invention is severely restricted.

Figure 9:
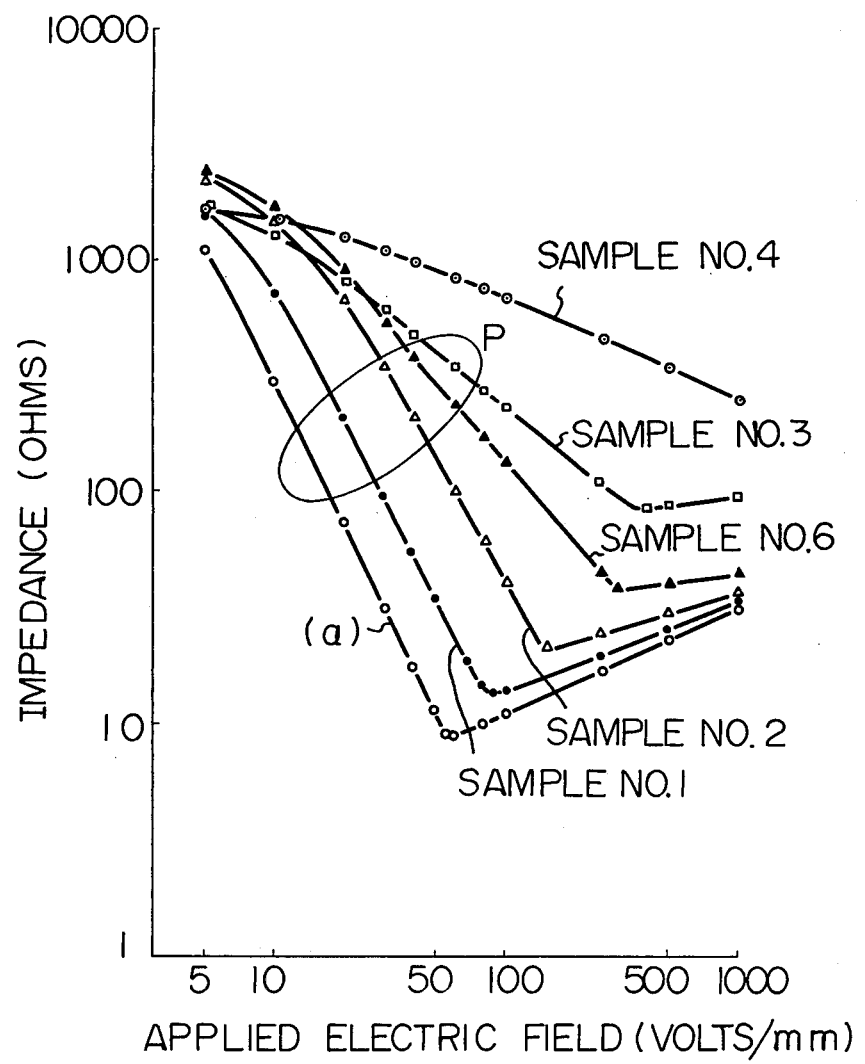

In the table 3, the sample No. 4 and the sample No. 8 are not included in the scope of the present invention, since the ratio ($Z_2/Z_1$) in those samples is not sufficient. The curve (a) in FIG. 9 shows the case that no impurity $Al_2O_3$ is included (weight % of $Al_2O_3$ is 0%).

TABLE 3

| Sample No. | Composition | Impurity | | Impedance $Z_1$ with 5 volts/mm | Minimum Impedance $Z_2$ with 500 volts/mm | Ratio $\left(\dfrac{Z_2}{Z_1}\right)$ |
|---|---|---|---|---|---|---|
| 1 | $BaTiO_3 + BaSnO_3 + MnCO_3$ 94 mol % + 6 mol % + 0.01 wt % | $Al_2O_3$ | 0.1 wt % | 1600 | 13.5 | 1/119 |
| 2 | " | " | 0.3 wt % | 2250 | 21.5 | 1/105 |
| 3 | " | " | 0.5 wt % | 1600 | 85 | 1/19 |
| X4 | " | " | 0.7 wt % | 1600 | 340 | 1/4.7 |
| 5 | " | $SiO_2$ | 0.1 wt % | 1500 | 15 | 1/100 |
| 6 | " | " | 0.3 wt % | 2350 | 39 | 1/60 |
| 7 | " | " | 0.5 wt % | 1800 | 120 | 1/15 |
| X8 | " | " | 0.7 wt % | 1500 | 500 | 1/3 |

APPLICATION TO INDUSTRY

As described above, the present current restriction element has good sensitivity to an alternate voltage, and decreases the impedance to 1/10–1/100 when an alternate field is applied. Further, the present element keeps excellent characteristics even at a high temperature, since the present element is ceramics. Accordingly, the

TABLE 2

| No. | Composition | | | Additive | | Impedance $Z_1$ with 5 volts/mm | Minimum Impedance $Z_2$ with 500 volts/mm | Ratio $\left(\dfrac{Z_2}{Z_1}\right)$ |
|---|---|---|---|---|---|---|---|---|
| 1 | $BaTiO_3 + BaSnO_3$ | 6 mol % | $MnCO_3$ | | 0.005 wt % | 800 | 8.6 | 1/93 |
| 2 | " | | " | | 0.01 wt % | 1100 | 9.2 | 1/119 |
| 3 | " | | " | | 0.1 wt % | 900 | 12.0 | 1/75 |
| 4 | " | | " | | 0.2 wt % | 850 | 23.5 | 1/36 |
| 5 | " | | " | | 0.3 wt % | 1100 | 62.0 | 1/18 |
| X6 | " | | " | | 0.5 wt % | 1000 | 230.0 | 1/4.3 |
| 7 | " | | $Cr_2O_3$ | | 0.005 wt % | 700 | 8.0 | 1/88 |
| 8 | " | | | | 0.01 wt % | 720 | 9.0 | 1/80 |
| 9 | " | | | | 0.1 wt % | 800 | 10.5 | 1/76 |
| 10 | " | | | | 0.2 wt % | 900 | 20.0 | 1/45 |
| 11 | " | | | | 0.3 wt % | 980 | 58.0 | 1/17 |
| X12 | " | | | | 0.5 wt % | 1050 | 108.0 | 1/9.7 |
| 13 | " | | $MnCO_3$ | | 0.05 wt % | 1200 | 13.0 | 1/92 |
| | | | $Cr_2O_3$ | | 0.05 wt % | | | |
| 14 | " | | $MnCO_3$ | | 0.1 wt % | 1000 | 32.5 | 1/31 |
| | | | $Cr_2O_3$ | | 0.1 wt % | | | |

(Embodiment 3)

The samples which show an excellent characteristic in the embodiments 1 and 2 are tested again by adding some impurities which are sometimes included in raw material or added in producing process as shown in the table 3. Our experimental result is shown in the table 3 and FIG. 9, in which it is found that said impurities must present element is applicable to a current restriction element with small size and some impedance, and one of the examples of the application of the present invention is a ballast of a fluorescent lamp. Further, there are many applications in the electronic industry.

We claim:

1. A current restriction device responsive to an applied electric field comprising a ferro-electric polycrystalline ceramic with a main component of Barium-titanate ($BaTiO_3$), said device having a impedance ratio ($Z_2/Z_1$) of less than 1/10 wherein $Z_2$ is the impedance of said device measured with an alternating electric field lower than 500 volts/mm, and $Z_1$ is the impedance of said device measured with an alternating electric field of 5 volts/mm.

2. A current restriction device responsive to an applied electric field comprising a ferro-electric polycrystalline ceramic with a main component of Barium-titanate ($BaTiO_3$), a first additive selected from Sr and Pb substituted for part of Ba of said Barium-titanate, a second additive selected from Zr and Sn for part of Ti of said Barium-titanate, said device having an impedance ratio ($Z_2/Z_1$) of less than 1/10, wherein $Z_2$ is the impedance of said device measured with an alternating electric field lower than 500 volts/mm, and $Z_1$ is the impedance of said device measured with an alternating electric field of 5 volts/mm.

3. A current restriction device according to claim 1 or claim 2 wherein the ratio of impurities except of said main component and said additives is less than 0.5 weight percent.

4. A current restriction device responsive to an applied electric field comprising a ferro-electric polycrystalline ceramic with a main component of Barium-titanate ($BaTiO_3$), a first additive selected from Sr and Pb substituted for part of Ba of said Barium-titanate, a second additive selected from Zr and Sn substituted for part of Ti of said Barium-titanate, a mineralizer of at least one of 0.005–0.3 weight % of Cr and 0.005–0.3 weight T of Mn, said device having an impedance ratio ($Z_2/Z_1$) of less than 1/10, wherein $Z_2$ is the impedance of said device measured with an alternating electric field lower than 500 volts/mm, and $Z_1$ is the impedance of said device measured with an alternating electric field of 5 volts/mm.

5. A current restriction device according to claim 4 wherein the ratio of impurities except of said main component, said additives, and said mineralizer is less than 0.5 weight percent.

* * * * *